(12) United States Patent
Tůma

(10) Patent No.: US 7,407,385 B2
(45) Date of Patent: Aug. 5, 2008

(54) SIMULATION UNIT

(76) Inventor: Pavel Tůma, Krásova 701/3, 130 00 Praha 3 (CZ)

( * ) Notice: Subject to any disclaimer, the term of this patent is extended or adjusted under 35 U.S.C. 154(b) by 256 days.

(21) Appl. No.: 11/103,891

(22) Filed: Apr. 12, 2005

(65) Prior Publication Data

US 2006/0121425 A1  Jun. 8, 2006

(30) Foreign Application Priority Data

Nov. 12, 2004  (CZ) ............... 2004-15975

(51) Int. Cl.
*G09B 19/00* (2006.01)
(52) U.S. Cl. .................................. 434/236
(58) Field of Classification Search ........... 434/219, 434/226, 236, 237; 296/21, 24.32, 24.4, 296/24.41

See application file for complete search history.

(56) References Cited

U.S. PATENT DOCUMENTS

| | | | | |
|---|---|---|---|---|
| 3,628,829 A * | 12/1971 | Heilig | ...................... | 297/217.4 |
| 4,526,548 A * | 7/1985 | Livingston | .................. | 434/226 |
| 4,958,874 A * | 9/1990 | Hegedus | .................. | 296/26.02 |
| 5,316,480 A * | 5/1994 | Ellsworth | ...................... | 434/29 |
| 5,375,899 A * | 12/1994 | Wright | .......................... | 296/21 |
| 5,706,616 A * | 1/1998 | Fernandez | .................... | 52/143 |
| 6,042,382 A | 3/2000 | Halfhill | | |
| 6,209,939 B1 * | 4/2001 | Wacker | ...................... | 296/24.3 |
| 6,470,630 B1 * | 10/2002 | Miyamoto | ...................... | 52/64 |
| 6,497,442 B1 * | 12/2002 | Wacker | ...................... | 296/24.32 |
| 6,817,866 B1 * | 11/2004 | Ginzburg et al. | ............. | 434/365 |
| 2003/0017439 A1 | 1/2003 | Rapoza et al. | | |

FOREIGN PATENT DOCUMENTS

| | | |
|---|---|---|
| CZ | 875-92 | 3/1992 |
| DE | 41 24 301 A1 | 7/1991 |
| EP | 0 927 566 B1 | 5/2003 |

* cited by examiner

*Primary Examiner*—Kurt Fernstrom
(74) *Attorney, Agent, or Firm*—The Law Firm of Gary F. Witting; Gary F. Witting

(57) ABSTRACT

A simulation unit which comprises at least two separated sections that are visually, odorously and thermally different and have means for creation of a given simulated environment and providing information for influencing the human senses and making the impression having effect on human memory, whereby said means comprise multimedia technique, air-conditioning units, mechanical odour sprayers, colour modifications and accessories of such spaces.

5 Claims, 1 Drawing Sheet

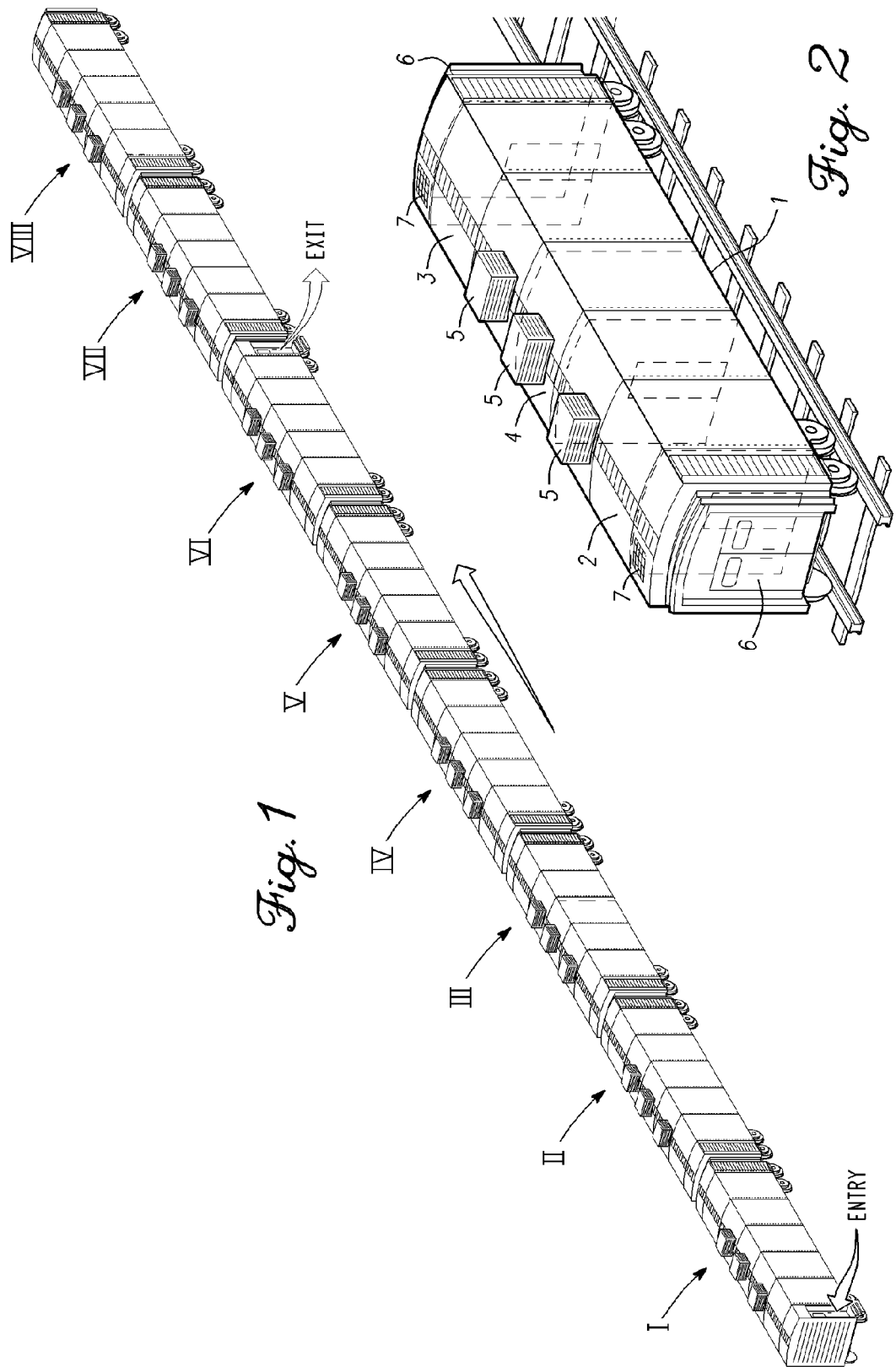

SIMULATION UNIT

FIELD OF THE INVENTION

The present invention relates to equipment for simulation of experience with effect on human memory, particularly for simulation and discouraging from using drugs.

BACKGROUND OF THE INVENTION

The use of drugs, particularly by young people, is a worldwide problem. Approach to this problem involves international effort aimed at control of drug production and drug flow as well as various sets of educational programs and various functional models aimed at deterring from taking drugs, which programs use conventional passive media like story telling, books reading, video watching, etc.

In the art, solutions are known that concentrate on the drug user side, on interactive methods of influencing, with the aim to increase effect of the anti-drug messages, such as interactive video, manual and multimedia computer games that catch attention of young people. Such methods should provide simulated experience on the basis of own decision to take or not to take drugs and the subsequent demonstration of the results, effects, and decisions. Systems for such simulation are versatile equipment, applicable anytime, in time and at various stages of the drug taking, they have a number of various embodiments.

EP 927,566 discloses equipment and a method for interactive simulation of the drug taking consequences and for disgusting the drug taking to young people, where the stimulated drug taking provides increased excitement from movements and sounds and apparent gambling passion. After a certain time this effect is weakened, the gambler requires to get another dose. This scenario repeats, but with every repeat the tolerance against drugs increases, the time of the "maximum excitement" shortens and increased percentage of the gambler's time is more and more dependent on getting and using drugs. The series of repeating converts the internal euphoria into frustration (feelings of futility or fury) and in this way they strongly effect against drug taking. This process is illustrated by equipment in the form of a modified multimedia game on the basis of motorcycle racing.

It is an objective of the present invention to provide simulation equipment using advanced technique for simulation of a given environment, particularly of the environment that disgusts drug taking, as well as of the environment for creating for example of advertising space.

Solutions of mobile means, e.g. special modifications of railway carriages, for various purposes are known.

The published CZ invention application PV 1992-875 discloses a design modification of a railway carriage, which railway carriage is closed and comprised of an independent undercarriage, a frame and transport space, which transport space is transversely to the longitudinal axis of the railway carriage separated into several independent compartments that form transportation cells. A cell can be provided with standardized elements for container handling and reloading openings in the face, side or roof surfaces.

DE-DOS 41 24 301 discloses an arrangement of the internal space of a railway carriage for local trains, which railway carriage is divided into a surface for standing passengers, seats area and a multipurpose area, which areas are separated by semitransparent partitions. The seats area is further divided into the short-time and the long-time areas, with seats arranged for various occasions during the journey. The short-time area seats are in right angles or diagonally to the train movement direction. This arrangement serves for accommodation of the passengers and for accommodation of the space for their comfort in the train.

None of the disclosed solutions meets the requirements imposed on a simulation unit according to the present invention

SUMMARY OF THE INVENTION

A simulation unit according to the present invention comprises at least two separated sections that are visually, odorously and thermally different and have means for creation of a given simulated environment and providing information for influencing the human senses and making the impression having effect on human memory, whereby, said means comprise multimedia technique, air-conditioning units, mechanical odour sprayers, colour modifications and accessories of such spaces.

Two closed and by an interspace separated sections are provided in the transportation space of a railway carriage with an independent undercarriage and a frame and form an independent multimedia presentation space.

The sections are formed by a first section with the cinema room space and a space for dialogue and the other section with an exhibition space.

The two separated sections and the interspace between them are provided with independent air-conditioning units.

According to a preferred embodiment, the unit according to the present invention is formed as a mobile simulation unit comprising pairs of sections separated by an interspace that are arranged one after the other, where the sections are chosen from the group comprising a section with a cinema room and a space for dialogue, a section with an exhibition space and a section where initial information is provided and organizational work is done, wereby, each of sections pairs is arranged in an independent railway carriage of a set of carriages, whereby, to the last railway carriage of the sections pairs a railway carriage with a communication space is attached and to this railway carriage then a railway carriage with technical equipment is attached, whereby, said means are means for simulation of the environment and results of drug taking.

The simulation unit is an equipment used to influence human senses—the sense of sight, the sense of hearing, the sense of smell, the sense of touch and the sense of taste—of a visitor, customer or client with the objective to leave an unforgettable experience that remains in his/her long-time memory for ever. The simulation unit is applicable for commercial purposes as a promotional action, for demonstration of a product or a service, but particularly for antidrug purposes.

The simulation unit uses advanced techniques for imitating various places that are difficult to access in real life and for their arrangement into a certain meaningful whole. The advanced techniques used in this technical solution that are already a common part of our everyday life nowadays, should attract attention particularly of young people, evoke interest and respect in much greater extent than e.g. the traditional lectures of videotapes with educative programmes about drug problems. The simulation unit can be created as a mobile or stationary unit.

BRIEF DESCRIPTION OF THE DRAWINGS

The invention in its various aspects will now be described with reference to certain drawings thereof, in which FIG. 1 shows a schematic illustration of a simulation unit as a set of carriages, an antidrug train, and FIG. 2 shows one railway carriage, an independent presentation space of a mobile simulation unit.

DETAILED DESCRIPTION OF THE INVENTION

The main mission of a simulation unit is to influence all human senses of a visitor (customer, client) maximally—the sense of sight, the sense of hearing, the sense of smell, the sense of touch and the sense of taste—and to leave an unforgettable impression in his/her long-time memory remaining for ever. For this purpose the simulation unit comprises means for creating the given simulated environment and providing information for influencing human senses and evoking experiences with an effect on human memory. The simulation unit comprises means for creating a combined more channel sound, projecting equipment, air-conditioning unit, mechanical odour sprayers, colour arrangements and accessories of such spaces. It is possible to serve tasting samples or distribute presents. The simulation unit is applicable for commercial purposes, but particularly for antidrug purposes.

The simulation unit can be both in the form of a mobile unit and a stationary unit. The mobile unit can be e.g. in the form of a set of carriages, so as it will be described in greater detail below. The stationary unit can be formed e.g. as a limited space—a box in a hall, which box can be dimensionally modified by changing its length, width and height.

In case of a commercial use, the use of such simulation unit (promotional campaign, product demonstration, service) should leave a very positive experience in persons. Contemporary producers try to combine their product with a pleasant vision, so as relaxation, appreciation in society, natural and mental beauty, power. Humans then subconsciously combine the promoted mark with the desired experience and prefer it. In this case a person could recognize e.g. a pleasant scent or odour invoking a recollection of a perfect presentation of a given service or product and to decide for a given service or product.

In case, the simulation unit is used for the antidrug purposes, the effect of a visit of the antidrug unit on the visitors can be divided into the short-time and the long-time effects. Immediately after a visit the visitor will be disturbed by the demonstrated dangerousness of drugs and should have a feeling that he/she learned something new. After a time, this experience should be impressed deep in his/her memory.

From the long-time point of view, the visit should leave a negative feeling in a person, which feeling is then recollected in a risky situation when drug is offered to him/her. The association formed should trigger an "alarm" in the person's brain and the person refuses the drug.

In a preset time limit, a visitor will pass through individual sections of the unit, which sections are hermetically separated from each other. The sections are different visually (interior), odorously (mechanical sprayer), and thermally (air-conditioning units). Different temperatures attack the touch sensing receptors that are responsible not only for the feeling of coolness and warmth but also evoke a maximally realistic perception of the environments imitated in the respective sections. The sections are organised to represent a meaningful whole (life story, gradual production of a product or development of an idea). In each section, a customer is informed about new information using multimedia. Audiovisual programs are combined with a possibility of individual performances of a guide and in case of an antidrug program they are prepared according to real human stories. In sections the classical guide/supervisor is substituted by one trained amateur non-actor (representing for example a father, a policeman, a doctor), which non-actor also conducts a dialog with visitors. The characters played by amateur non-actors are an ideal articulation of the need for presence of an accountable supervision in sections and interconnection of a film fiction with reality. Important are also the olfactory perceptions. The olfactory sense can evoke immediate feelings, emotions and recollections. Even the slight whiff of scent or pleasant smell of a human, object or place can evoke in us a long forgotten recollection and at the same time recall the disappeared images, sounds and tastes. Such experience is sometimes accompanied also by deeper emotions. Emotions should be evoked not only by the screened films (spots, promotional films, documents) with perfect space sound but also by colour design and accessories of individual sections.

An example of an embodiment of a simulation unit according to the present invention will now be described in greater detail on an example of an antidrug mobile simulation unit in the form of a set of carriages with reference to the attached drawing.

A mobile unit comprises pairs of sections arranged one after the other. Each pair of sections is situated in an independent railway carriage I to VI of a set of carriages, the numbering being in the direction of an arrow A in FIG. 1. Between the sections of a pair there is an interspace 4 serving for air cleaning and for absorption of odour from the previous section. Both the individual sections and the interspace 4 are provided with independent air-conditioning units 5. The set of carriages comprises a railway carriage I provided with sections where the initial information is provided and organizational work is done and with exhibition and advertising space and railway carriages II to VI with sections, the first section being a section with a cinema room space 1 provided with projecting facilities and a space 2 for conducting a dialog where things are explained and the second section with an exhibition space 3, the sections being separated by a retractable curtain. Railway carriage VI comprises a section with an exhibition space 3. Interconnection between individual railway carriages I to VI is provided by a common interconnection between railway carriages of a set of carriages, i.e. by a passage tunnel 6 and sliding doors on ends of both connected railway carriages. The passage tunnel 6 is always provided with a fan 7 to remove odour of the preceding section in the preceding railway carriage. To a railway carriage VI is also attached railway carriage VII, which is provided with a communication space and to the railway carriage VII is attached a railway carriage VIII provided with technical equipment.

Railway carriages I to VIII, individual carriage sections, section spaces with interspaces 4 between sections including the passage tunnels 6 between the carriages of a set of carriages in FIGS. 1 and 2 are distinguished by different shading to illustrate better how a set of carriages is assembled.

Individual hermetically closed and mutually separated sections distinguish visually, odorously and thermally and are provided with means necessary to create the given simulated environment and provide mutually different information for influencing human sensors and evoking experience with effect of human memory. Such means comprise equipment for creation of combined multichannel sound to influence hearing, projecting equipment like TV screens, monitors, projecting screen, coloured and material finish of the space to influence sight, air-conditioning units to control temperature of the given space and material finish to influence the sense of touch, mechanical sprayers of odours belonging to the given simulated environment to influence olfactory sense and here it is also possible to offer tasting to influence human sense of taste.

In the given case the specified means are selected so that they stimulate individual environments assembled into a one meaningful whole, for example a human story, and always gradually provide new information about consequences of taking drugs.

The first railway carriage I of the set of carriages is arranged as an informational, organizational, exhibition and advertising centre. It is provided with two sections that with introductory information and that with organisational space as well as with the exhibition and advertising spaces.

The entry space is a turnstile with a reception for calming the visitor, catching of his attention and concentration. It is provided with a through, vibrating and shade changing heart with pointers in colour, equipment for music producing heart beat sound, a jet producing water mist. Its climate is neutral.

The space for dialog represents familiarising with the project and creation of groups of visitors. It is provided with a TV screen and a guide provides a presentation there. The space is illuminated by coloured light, photographs and graphs show state of a so far healthy human body, special sound intensifies atmosphere, uneven walls with plastic protrusions provoke imagination, the space is only ventilated and at its end is entrance to the space of the second section.

It is an exhibition and advertising section. Luxuriously equipped environment in national colours, humidified fresh air with pleasant scent, sound effects, monitors with running video clips about deeds of important personalities of the nation, photographs of selected personalities and conversation of the guide with important personalities from a TV screen about harmfulness of drug taking and strong will of important personalities.

From the second railway carriage II to the sixth railway carriage VI each carriage is comprised of two sections separated by an interspace 4, which interface 4 is serving for cleaning of the air and for removal of the odour from the preceding section.

The first section of the railway carriage II comprises the space of a cinema room, what is a dark space with uneven walls, only with illuminated benches and marks on floor, a TV screen with an usher inviting to take seats, where a film is projected. The film subject is based on experience of people dealing with the drugs problem for a long time. It is a simple story about a boy at the threshold of adulthood and an older girl having experience with drugs taking. The film has four sequels (altogether four cinema rooms in four carriages). The film is the main story link between the space 2 for a dialog and the exhibition space 3. A visitor of the film recognises his/her own or other family. In the air he/she can smell cigarette smoke and that of warmed up food.

A wire curtain separating the cinema room 1 space and the space 2 for dialog is then removed and the cinema room is illuminated.

The space 2 for dialog is a family living room with its furnishing and a guide—the father from the film who is watching TV, smoking, drinking and talking to the visitors and sending them to the next section to see the boy from the film. The visitors have displeasure feeling caused by the father's behaviour, they can touch the interior, they can smell smoke and food. The second section of the railway carriage II is an exhibition room 3 representing the environment of a nightclub. The space is illuminated by coloured light, there is a big projection, noisy music, sultriness, warmth and misty space. During presence in this space a guide offers drugs, the drug is advertised.

The third railway carriage III comprises the same cinema room 1 with projection of the second sequel of the film showing new friends, playing truant, a night in the nightclub and the first experience with the drug, violence and thefts, new diseases and ends with a ride with a crash. The visitor is influenced the feeling of danger, he/she can smell petrol, oil and burnt rubber.

The wire curtain separating the cinema room 1 from the space 2 for dialog is removed.

In the space 2 for dialog is a wreckage of the car with lights switched on, there is a boy in the wreckage, a policeman is giving order to leave the space.

The illuminated cinema room 1 brings into light photographs of the crash on monitors, one can hear horn, wailing of an ambulance, there are pieces of glass and fragments on the floor and hot steam leaks from the car radiator, one can smell petrol and burnt rubber.

Exhibition space 3 of the second section represents a jail cell, a policeman is locking the door. The visitors are affected negatively by this environment. They can hear shouting and quarrel of cellmates, they have possibility to try the hard plank beds, they smell the unpleasant odour.

The fourth railway carriage IV comprises the same cinema room 1, where the third sequel of the film is projected. This sequel deals with criminality, jail and consequences of drug dependency—rapes, assaults, drug distribution, spoilt health. The boy and the girl get to the margin of the society. The visitors are affected by disgust, they can smell disinfectants from the consulting room of a physician.

The wire curtain separating the cinema room 1 space from that for dialog 2 will be removed.

In the room for dialog 2 there is an illuminated consulting room of a physician. The physician talks with the visitors about health consequences of taking drugs. Visitors realize the danger from diseases, there are involved in a dialog and healthy and damaged lungs are displayed, they can hear voice of a physician, sounds from a consulting room, they can touch furniture in a consulting room, they smell the disinfectants.

The exhibition space 3 represents the last phase of the process of gradual separation of a drug addict from society. Here an intoxicated mother with a hungry suckling is demonstrated in a room, a place where drug dependent persons live. The visitors can see a disgusting room with snowing TV, they can hear crying of the suckling, they have possibility to touch the space, they can smell how musty the room is.

The fifth railway carriage V comprises a cinema room 1 with projection of the final sequel of the film. The visitors can see a sanatorium and the regime in it, again the street with its infections, appearance of an addict, overdosing, death of a friend, and the film ends with decision of the boy to put an end to drugs. He goes in search of the girl he is expecting a baby with. The visitor feels sympathy with him and supports the boy in the story. Air smells neutrally here.

In the room for dialog 2 there is a projection appealing to the human personality. There is a liquid filled cylinder with an unborn foetus here. The visitors are angry at the irresponsible parents, on monitors in the cinema room there are clips from a sanatorium, the visitors can hear dramatic music.

The exhibition space 3 shows an old storeroom, a place with the overdosed girl. The visitors are sad about the wasted life, they hear sounds of dripping water and dramatic music, they climb over hurdles, they smell sweetish smell of death.

The sixth railway carriage VI comprises the first section with an exhibition space 3 with projection on miniscreans, with possibility of a choice between personal realization of a person and temptation, and an appeal to resist against manipulation and drugs. Famous personalities who resisted drugs and their success, attractive places are displayed. The visitors are affected to be strong and to resist drugs, they can smell fresh air and scent.

The exhibition space 3 of the second section represents an exhibition of success of selected persons. Gifts for visitors are distributed. The visitors feel relief after what they have seen. They can smell fresh air with a scent. An exit from the railway carriage VI follows.

The seventh railway carriage VII is a discussion space, a space for cultural events, local specialists or politicians can be involved, etc.

The eighth railway carriage VIII is the technical background and accommodation space for guides and technical staff.

INDUSTRIAL USE

The present invention will find commercial uses in promotional events, products or services demos. Particularly is can be used for demos of risk situations and to deter from drug use.

The invention claimed is:

1. A simulation unit comprising: means for creation of a given simulated environment and for providing information for influencing human senses and for evoking on experience having effect on human memory, wherein said means comprise multimedia technique, air-conditioning/ventilation units, mechanical odour sprayers, color modifications and accessories of spaces, said simulation unit further comprising at least two separated, in a sequence lined, interconnected and through sections, which sections are visually, odorously and thermally distinguished from each other, wherein, each section having a different one of said means for creation of a different given individual simulated environment and for providing of information corresponding to the given individual simulated environment for influencing of the human senses and for evoking of an impression having effect on human memory, and said sections being lined up so that said individual simulated environments create, in combination, one resultant model whole which is either an educational program or a model of an environment where drugs are used.

2. A simulation unit of claim 1 characterized in that said two closed and by an interspace (4) separated sections are provided in the transportation spaces with an independent undercarriage and a frame and form an independent multimedia presentation space.

3. A simulation unit of claim 1 characterized in that said sections are formed by a first section with the cinema room (1) space and with a space (2) for dialogue and the other section with an exhibition space (3).

4. A simulation unit of claim 1 characterized in that said two separated sections and the interspace (4) between them are provided with independent air-conditioning units (5).

5. A simulation unit of claim 1 characterized in that said simulation unit is formed as a mobile railway unit comprising pairs of sections separated by an interspace (4) that are arranged one after the other, where the sections are chosen from the group comprising a section with a cinema room (1) and a space (2) for dialogue, a section with an exhibition space (3) and a section with a space where initial information is provided and organizational work is done, and a section with an entry exhibition and advertising space is provided, wherein, each of said sections pairs of sections is arranged in an independent railway carriage (I to VI) of a set of carriages, wherein to the last railway carriage (VI) a railway carriage (VII) with a communication space is attached and to this railway carriage (VII) then a railway carriage (VIII) with technical equipment is attached, wherein said means are means for simulation of the environment and of consequences of drug taking.

* * * * *